US007796286B2

(12) United States Patent
Omotani

(10) Patent No.: US 7,796,286 B2
(45) Date of Patent: Sep. 14, 2010

(54) IMAGE FORMING APPARATUS, REPLACEMENT PART, METHOD AND APPARATUS FOR RECYCLING REPLACEMENT PART, AND METHOD OF CONTROLLING IMAGE FORMING APPARATUS

(75) Inventor: Toshikatsu Omotani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1185 days.

(21) Appl. No.: 11/339,670

(22) Filed: Jan. 26, 2006

(65) Prior Publication Data

US 2006/0192993 A1 Aug. 31, 2006

(30) Foreign Application Priority Data

Feb. 3, 2005 (JP) ............................ 2005-027950
Dec. 8, 2005 (JP) ............................ 2005-355210

(51) Int. Cl.
*G06F 3/12* (2006.01)

(52) U.S. Cl. .................... 358/1.15; 358/1.14; 358/1.16; 399/24; 347/2; 380/278; 380/283

(58) Field of Classification Search .................. 399/24; 358/1.14–1.16; 347/2; 380/278, 283
See application file for complete search history.

(56) References Cited

U.S. PATENT DOCUMENTS

| | | | | |
|---|---|---|---|---|
| 7,526,581 | B2 * | 4/2009 | Omotani | 710/15 |
| 2003/0123887 | A1 * | 7/2003 | Imes et al. | 399/24 |
| 2004/0120522 | A1 * | 6/2004 | Takeda et al. | 380/201 |
| 2004/0125165 | A1 * | 7/2004 | Croley et al. | 347/19 |
| 2006/0072145 | A1 * | 4/2006 | Simpson | 358/1.15 |
| 2006/0087678 | A1 * | 4/2006 | Simpson | 358/1.15 |
| 2006/0140647 | A1 * | 6/2006 | Adkins et al. | 399/12 |

FOREIGN PATENT DOCUMENTS

JP 2002-366008 12/2002

* cited by examiner

*Primary Examiner*—Chan S Park
(74) *Attorney, Agent, or Firm*—Oblon, Spivak, McClelland, Maier & Neustadt, L.L.P.

(57) ABSTRACT

An image forming apparatus includes a judging unit that judges whether a replacement part attached to the image forming apparatus needs replacement based on consumption information indicative of how much the replacement part has been consumed. The replacement part includes a storage unit that stores therein information including identification information unique to the replacement part. When the judging unit judges that the replacement part needs replacement, a reading unit reads the identification information from the replacement part, and an encrypting unit encrypts a predetermined piece of information in the replacement part based on the identification information read by the reading unit.

3 Claims, 9 Drawing Sheets

IMAGE FORMING APPARATUS, REPLACEMENT PART, METHOD AND APPARATUS FOR RECYCLING REPLACEMENT PART, AND METHOD OF CONTROLLING IMAGE FORMING APPARATUS

CROSS-REFERENCE TO RELATED APPLICATIONS

The present document incorporates by reference the entire contents of Japanese priority documents, 2005-027950 filed in Japan on Feb. 3, 2005 and 2005-355210 filed in Japan on Dec. 8, 2005.

BACKGROUND OF THE INVENTION

1. Field of the Invention

The present invention relates to an image forming apparatus having replacement parts, which are parts that can be replaced.

2. Description of the Related Art

Sometimes image forming apparatuses, like printers, are connected to a network (e.g. a Local Area Network (LAN)). In such network-connected image forming apparatuses, data is encrypted before outputting data that requires to be protected.

Also, in image forming apparatuses that form images by performing electronic photographing process, like a laser printer, some parts are replaceable. For example, photosensitive members and toner generally come as replacement parts in the form of process cartridges. A memory is included in such a process cartridge to store information necessary for the image forming operation. Even the information stored in the memory sometimes requires security protection.

Further, a method is conventionally disclosed for storing encrypted data and unencrypted data separately into a memory included in a process cartridge (see, for example, Japanese Unexamined Patent Application Publication No. 2002-366008).

Examples of replacement parts that can be attached and detached by a user to and from an image forming apparatus include a Hard Disc Drive (HDD) and a process cartridge. An information storage unit included in such a replacement part sometimes stores therein data that requires security such as the user's personal information. There is a risk that the data stored in such a replacement part may be illegitimately copied or tampered by a third party after the replacement part is detached from the image forming apparatus.

As a technique for solving this kind of problem, the Japanese Unexamined Patent Application Publication No. 2002-366008 discloses an invention related to a method for storing encrypted data and unencrypted data separately into a memory included in a process cartridge.

According to this method, however, a decryption key used for decoding the encrypted data is stored in an unencrypted area. Thus, there is a risk that the encrypted data may be easily decoded by a third party.

As another example, if a replacement part inevitably needs to be recycled or disposed of, for example, when the life of the apparatus or the replacement part comes to the end, the replacement part will fall into the hands of a third party like an intermediary agent or a transporting agent. In such an occasion, if the replacement part falls into the hands of a malicious third party, there is a risk that the information including personal information stored in the replacement part may be leaked.

Further, a replacement part sometimes stores therein information other than personal information; for example, manufacturing information, usage history information, and control information. If such information is tampered by a third party, there is a risk that the quality and/or the reliability of the apparatus and/or the replacement part may be damaged.

In view of these problems of the conventional technique, the present invention aims to provide an image forming apparatus, a replacement part that can be attached and detached to and from an image forming apparatus, a controlling method for an image forming apparatus, and a controlling method for a replacement part that can be attached and detached to and from an image forming apparatus, all of which are able to enhance the security level of the data stored in a replacement part that can be attached and detached to and from an image forming apparatus.

According to the present invention, when a need arises to replace a replacement part, the information stored in the replacement part is encrypted. It is therefore possible to achieve an effect of improving the security level of the information stored in the replacement part.

SUMMARY OF THE INVENTION

It is an object of the present invention to at least solve the problems in the conventional technology.

According to an aspect of the present invention, an image forming apparatus includes a connecting unit configured to be connectable to a replacement part, the replacement part having a storage unit that stores therein information including identification information unique to the replacement part; a replacement judging unit that judges whether the replacement part that is connected to the connecting unit needs replacement based on consumption information indicative of how much the replacement part has been consumed; an identification information reading unit that reads the identification information in the storage unit of the replacement part when the replacement judging unit judges that the replacement part needs replacement; and an encrypting unit that performs an encryption processing on a predetermined piece of information in the storage unit of the replacement part.

According to another aspect of the present invention, a replacement part recycling apparatus includes a connecting unit configured to be connectable to a replacement part, the replacement part having a storage unit that stores therein identification information unique to the replacement part and a predetermined piece of information on which an encryption processing has been performed, the predetermined piece of information in the storage unit including usage history information indicative of a status of usage of the replacement part during a period when the replacement part was connected to an image forming apparatus; a reading unit that reads the identification information in the storage unit of the replacement part that is connected to the connecting unit; a decrypting unit that performs a decryption processing on the usage history information in the predetermined piece of information in the storage unit of the replacement part based on the identification information read by the reading unit; and a recycling judging unit that judges whether the replacement part is recyclable based on the usage history information on which the decryption processing has been performed by the decrypting unit.

According to still another aspect of the present invention, a method of controlling an image forming apparatus includes establishing a connection between a replacement part and the image forming apparatus, the replacement part having a storage unit that stores therein information including identification information unique to the replacement part; judging based on consumption information indicative of how much the replacement part has been consumed whether the replacement part that is connected to the image forming apparatus needs replacement; reading the identification information from the storage unit of the replacement part when it is judged at the judging that the replacement part needs replacement; and performing an encryption processing on a predetermined piece of information in the storage unit of the replacement part.

According to still another aspect of the present invention, a method of recycling a replacement part with a replacement part recycling apparatus includes establishing connection between a replacement part and the replacement part recycling apparatus, the replacement part having a storage unit that stores therein identification information unique to the replacement part and a predetermined piece of information on which an encryption processing has been performed, the predetermined piece of information in the storage unit including usage history information indicative of a status of usage of the replacement part during a period when the replacement part was connected to an image forming apparatus; reading the identification information in the storage unit of the replacement part that is connected to the replacement part recycling apparatus; performing a decryption processing on the usage history information in the predetermined piece of information in the storage unit of the replacement part based on the identification information read at the reading; and judging whether the replacement part is recyclable based on the usage history information on which the decryption processing has been performed at the decrypting.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below with reference to the accompanying drawings.

Figure 1:
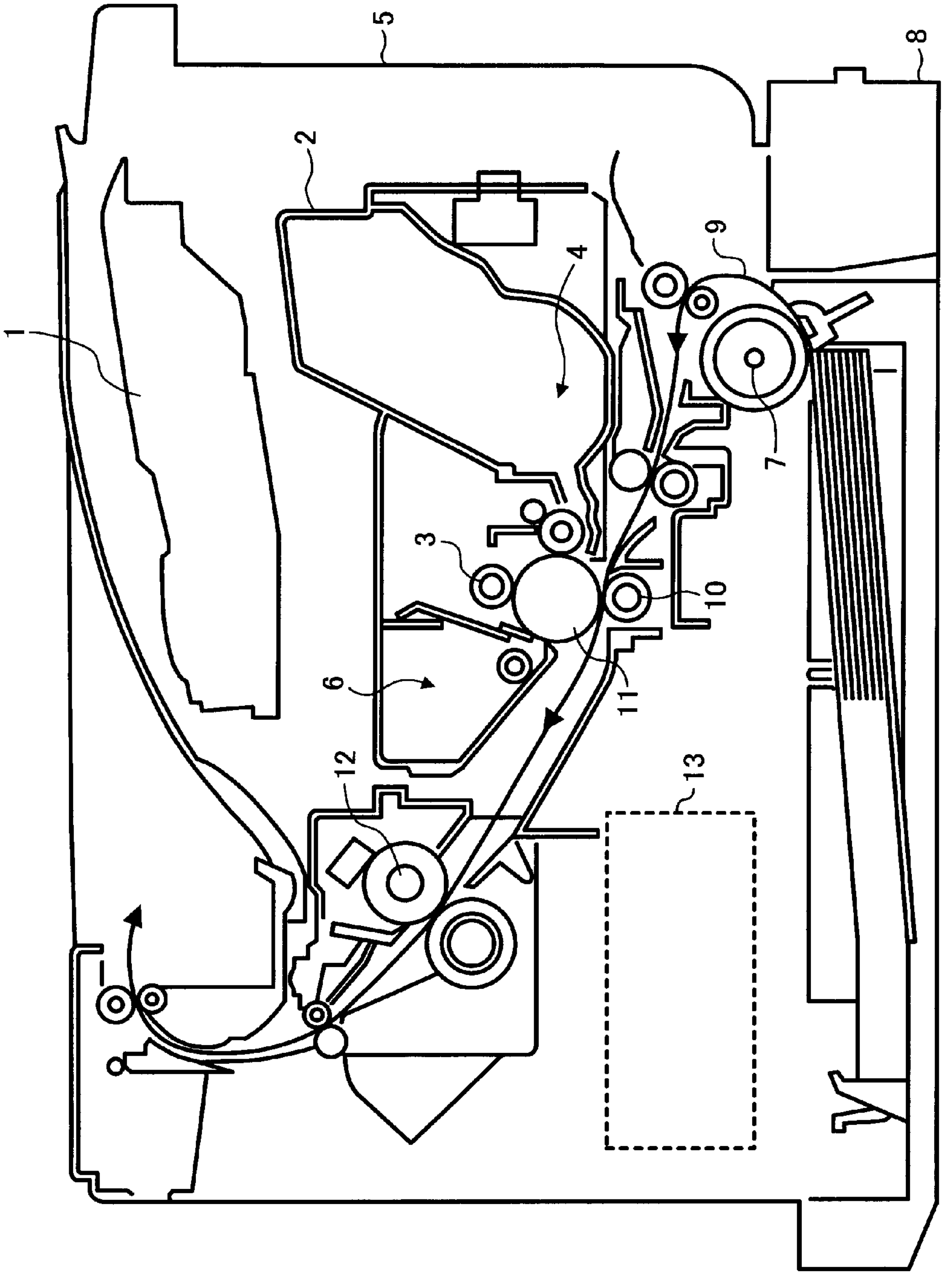
FIG. 1 is a schematic drawing of an internal configuration of an image forming apparatus according to a first embodiment of the present invention.

FIG. 1 is a schematic drawing of an internal configuration of an image forming apparatus 5 according to a first embodiment of the present invention.

A process cartridge 2 can be attached and detached to and from the image forming apparatus 5. The process cartridge 2 includes a photosensitive member 11, an electrically charged roller 3, a cleaning and used-toner collecting unit 6, and a developing and toner housing unit 4.

An optical system 1 includes a polygon motor, a polygon mirror, an Fθ lens, a laser diode, and a mirror. A sheet of recording paper 9 that is housed in a paper supply cassette 8 is carried over to the photosensitive member 11 by a paper supply roller 7. The photosensitive member 11 is driven and rotated in a clockwise direction. At that time, the surface of the photosensitive member 11 is electrically charged by the electrically charged roller 3. A laser beam is irradiated from the optical system 1 based on printing data outputted from a control section 13, so that a static latent image is formed on the photosensitive member 11. The static latent image is made into a visible image with a toner when going through the developing and toner housing unit 4. The visible image is transferred by a transfer roller 10 onto the recording paper 9 carried over to the photosensitive member 11, and then the recording paper 9 with the visible image is carried over to an image fixing roller 12 so that the visible image on the recording paper 9 is fixed before the recording paper 9 is ejected to the outside of the image forming apparatus 5.

Figure 2:
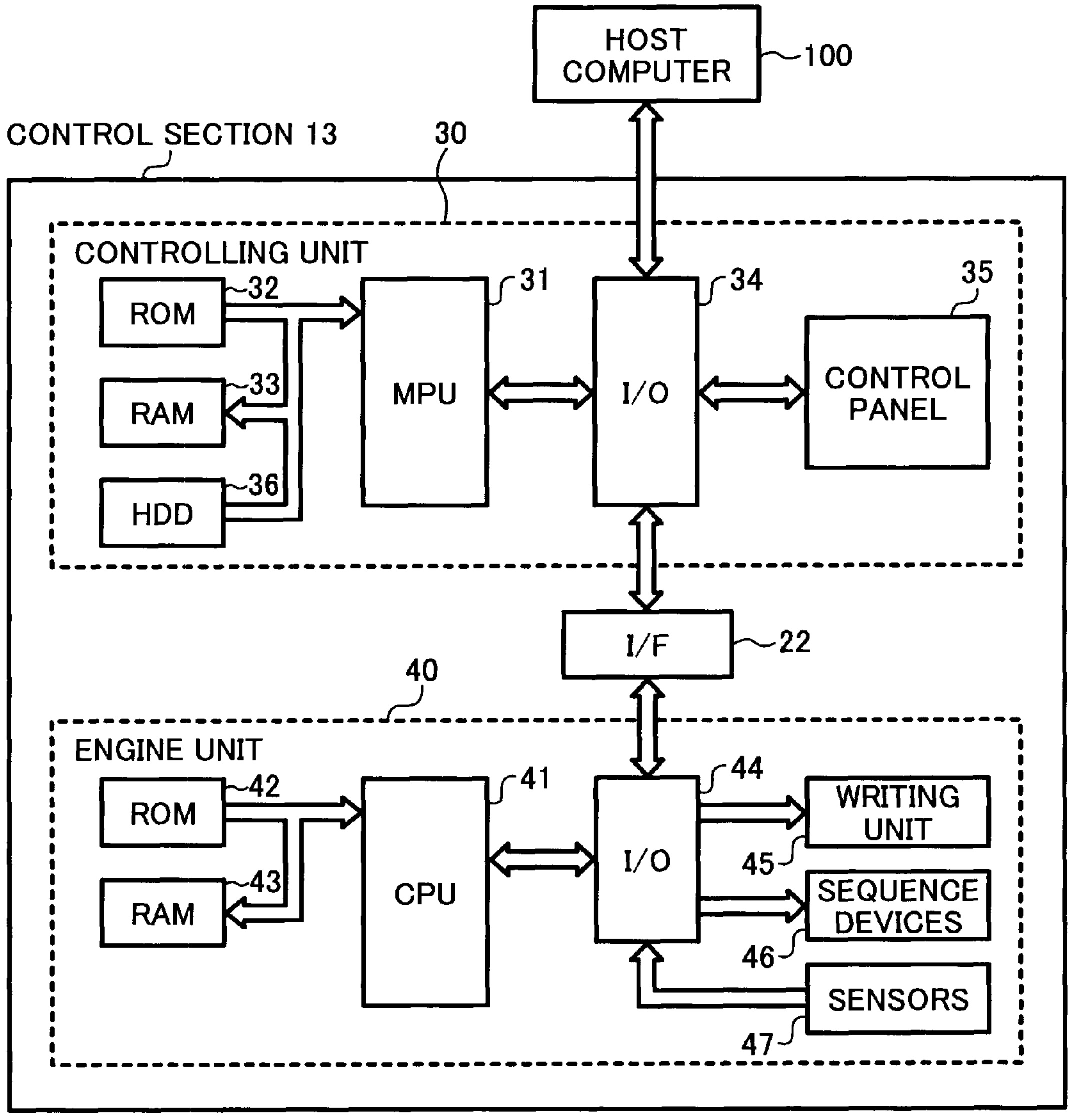
FIG. 2 is a detailed block diagram of a controlling unit shown in FIG. 1.

FIG. 2 is a block diagram of a system configuration of the control section 13.

The control section 13 includes a controlling unit 30, an engine unit 40, and an internal interface (I/F) 22. The control section 13 receives printing data transferred from a host computer 100 and expands the received printing data into bit map data in units of pages, using the controlling unit 30. The control section 13 then converts the bit map data into video data that is dot information and sends the video data to the engine unit 40 via the I/F 22 so as to perform sequence control and to form a visible image.

The controlling unit 30 includes a Micro Processing Unit (MPU) 31, a Read Only Memory (ROM) 32 that stores therein programs required by the MPU 31, constant data reading character fonts, and the like, a Random Access Memory (RAM) 33 that stores therein general data, dot patterns, and the like, a Hard Disc Drive (HDD) 36 that can be attached and detached to and from an apparatus and stores and saves therein data in a large volume, an Input/Output unit (IO) 34 that controls inputs and outputs of data, and a control panel 35 that is connected to the MPU 31 via the I/O 34. These constituent elements of the controlling unit 30 are connected to each other via a data bus, an address bus, a controller bus, or the like. Each of the host computer 100 and the I/F 22 is connected to the MPU 31 of the controlling unit 30 via the I/O 34.

The engine unit 40 includes a Central Processing Unit (CPU) 41, a Read Only Memory (ROM) 42 that stores therein programs required by the CPU 41, constant data, and the like, a Random Access Memory (RAM) 43 that stores therein temporary data, and an Input/Output unit (I/O) 44 that controls inputs and outputs of data. These constituent elements of the engine unit 40 are connected to each other via a data bus, an address bus, a controller bus, or the like.

It is acceptable to have an arrangement wherein the RAM 43 stores therein data other than the temporary data as described above. For example, RAM 43 may store therein history data for encryption and/or decryption processing performed on the process cartridge 2. In a piece of history data, for instance, a piece of maintenance ID information that indicates information for identifying the process cartridge 2, a type of the processing that has been performed (to be more specific, either an encryption processing or a decryption processing), and information related to the date and time of the processing are stored while being in correspondence with one another. A piece of history data like this is automatically added every time the image forming apparatus 5 performs a processing. As long as the process cartridge 2 remains to be attached to the image forming apparatus 5, it is possible to judge whether a specific piece of data has been encrypted by referring to the history data.

The I/O 44 is connected to the I/F 22. The I/O 44 receives an input of video data from the controlling unit 30 and an input related to the status of switches provided on the control panel 35, as well as makes an output of an image clock (WCLK) and an output of a status signal indicating that the apparatus is out of paper, to the controlling unit 30.

The I/O 44 is also connected to a writing unit 45, reading sequence devices 46, and various kinds of sensors 47. The I/O 44 is also connected to the process cartridge 48 and is able to communicate with a memory tab that is provided on the process cartridge 48.

The controlling unit 30 receives command reading character data like a printing instruction and printing data like image data from the host computer 100 and edits these pieces of data. When the data is made up of character codes, the controlling unit 30 converts the character codes into dot patterns that are necessary for the writing of an image, using a character font stored in the ROM 32 and expands the bit map data of character reading images (hereinafter, collectively referred to as an image) in units of pages into a video RAM area within the RAM 33. Subsequently, when the engine unit 40 inputs a WCLK together with a ready signal to the controlling unit 30, the controlling unit 30 outputs the bit map data expanded into the video RAM area within the RAM 33 to the engine unit 40 via the I/F 22, as video data that is synchronized with the WCLK.

The control panel 35 has switches and a display device, which are not shown in the drawings, and can be used for controlling data according to an instruction from an operator, transmitting the information to the engine unit 40, and displaying the status of the image forming apparatus 5 on the display device. The engine unit 40 controls the writing unit 45, the reading sequence devices 46, and the like, according to the video data that is inputted from the controlling unit 30 via the I/F 22 and on which dot correction has been made. The engine unit 40 also outputs video data necessary for the writing of images to the writing unit 45, as well as receives an input of a signal indicating the status of each of the elements of the engine unit 40 from the various kinds of sensors 47 and processes the inputted signal. In addition, the engine unit 40 outputs necessary information and a status signal indicating an error status (for example, the apparatus is out of paper) to the controlling unit 30 via the I/F 22.

Figure 3:
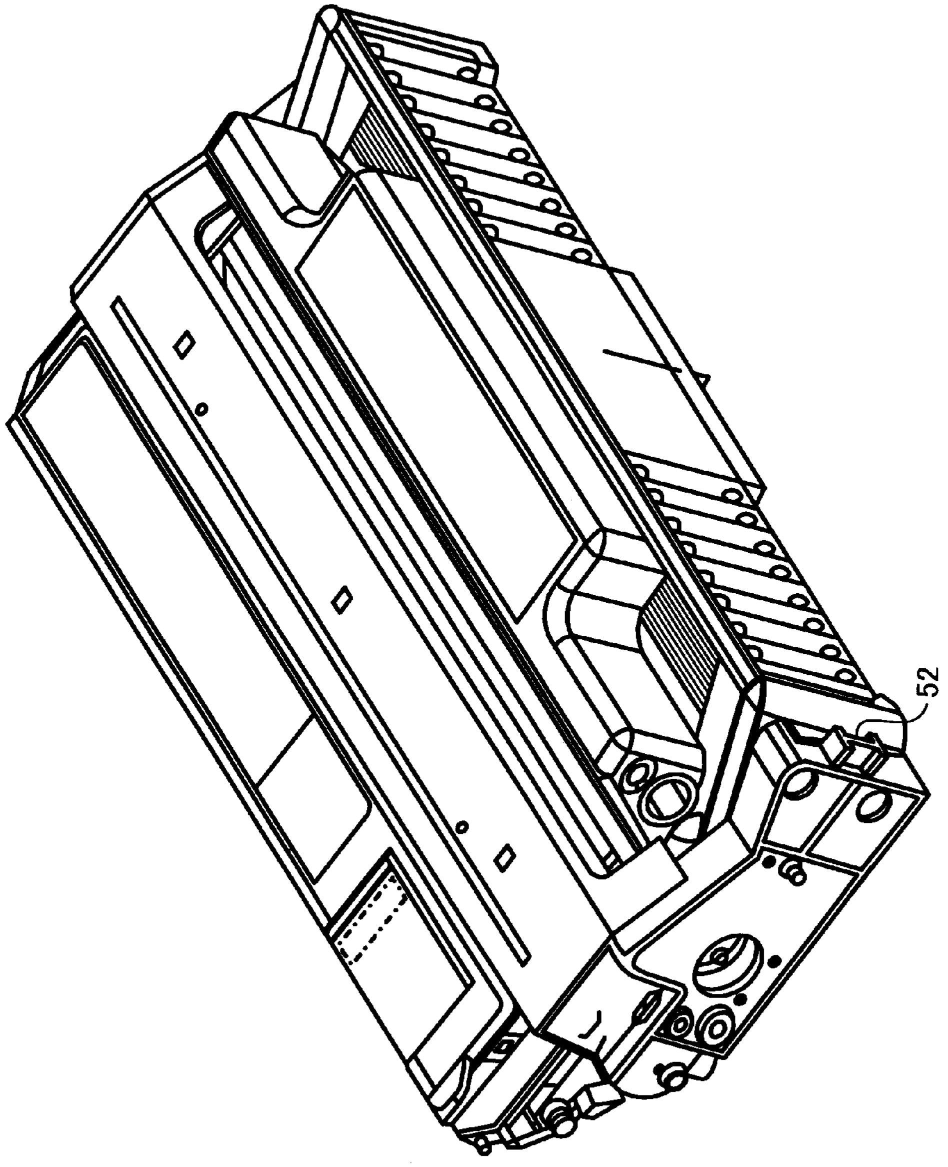
FIG. 3 is a perspective view of a process cartridge to be attached to a body of the image forming apparatus shown in FIG. 1.

FIG. 3 is a perspective view of the process cartridge 2 that can be attached to the body of the image forming apparatus 5.

The process cartridge 2 is an All-In-One (AIO) device that incorporates an electrically charged roller 2*a*, a developing and toner housing unit 2*b*, a cleaning and used-toner collecting unit 2*c*, and a photosensitive member 2*d* altogether.

The process cartridge 2 shown in FIG. 3 includes a memory tab 52. The memory tab 52 includes a non-volatile memory and stores therein information related to the replacement part such as information necessary for controlling the photosensitive member unit (the process cartridge unit), a cartridge ID (maintenance ID information), a year-month-day of the manufacturing date, a year-month-day of the date on which the replacement part starts being used, how many times the replacement part has been recycled, how many copies have been made, and a year-month-day of the current date. Instead of the memory tab 52, it is also acceptable to use a printed substrate on which an IC chip is provided or a printed substrate on which a non-contact IC chip is provided.

Figure 4:
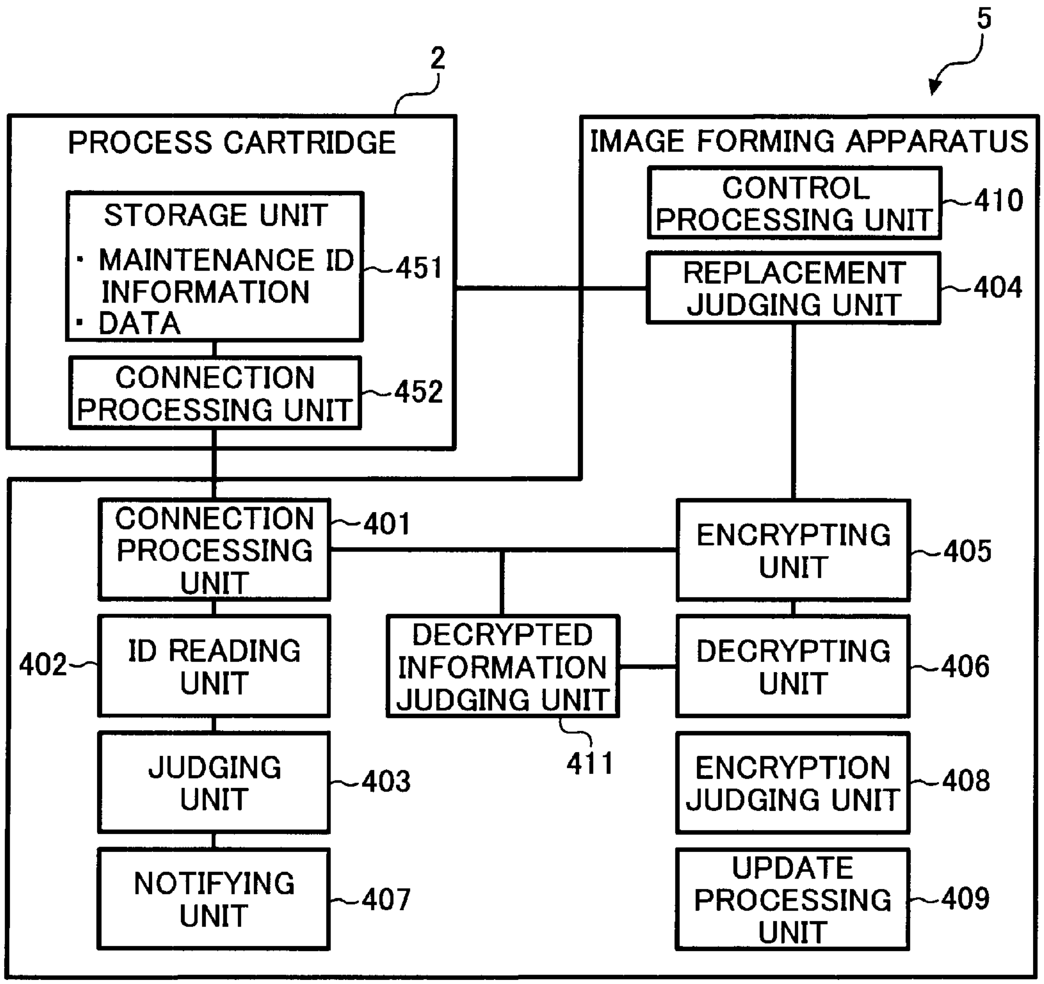
FIG. 4 is a block diagram of configurations of the image forming apparatus and the process cartridge according to the first embodiment.

FIG. 4 is a block diagram of configurations of the image forming apparatus 5 and the process cartridge 2. As shown in the drawing, the image forming apparatus 5 includes a connection processing unit 401, an ID reading unit 402, a judging unit 403, a replacement judging unit 404, an encrypting unit 405, a decrypting unit 406, a notifying unit 407, an encryption judging unit 408, an update processing unit 409, a control processing unit 410, and a decrypted information judging unit 411. It is possible to realize these constituent elements by having the CPU 41 execute an image forming program. The process cartridge 2 includes a storage unit 451 and a connection processing unit 452. Firstly, the image forming apparatus 5 is explained in the following section.

The connection processing unit 401 included in the image forming apparatus 5 can be connected with the process cartridge 2 and performs a receiving processing of the information inputted from the process cartridge 2 and a transmitting processing of the information outputted to the process cartridge 2. The connection processing unit 401 also makes an update request so that the data stored in the storage unit 451 included in the process cartridge 2 be updated, as necessary. The operation to be performed when an update request is made will be described later.

The ID reading unit 402 reads the maintenance ID information that is stored in the storage unit 451 included in the process cartridge 2.

The maintenance ID information is a piece of ID information used for identifying the process cartridge 2 and is, for example, a number that is unique to the individual process cartridge 2. Data includes specific data on which encryption and/or decryption processing is to be performed and usage history information. It is also acceptable to have an arrangement wherein the specific data includes, for example, data used for controlling the image forming apparatus 5 and the usage history information.

The judging unit 403 performs an authentication process on the maintenance ID information and judges whether it is possible to use the process cartridge 2 with the image forming apparatus 5. For example, the judging unit 403 may perform the authentication process by comparing the maintenance ID information read by the ID reading unit 402 with a piece of maintenance ID information stored in the main memory (RAM 43) of the image forming apparatus 5 and judging whether these pieces of maintenance ID information match.

The replacement judging unit 404 judges whether it is time to replace the process cartridge 2 that has been authenticated by the judging unit 403. The judgment of whether it is time to replace the process cartridge 2 is made based on consumption data that indicates the level of consumption of the process cartridge 2 and whether the process cartridge 2 has a disorder or not, the consumption data being inputted from, for example, a sensor (not shown) that monitors the process cartridge 2. In other words, the replacement judging unit 404 is able to judge whether it is time to replace the process cartridge 2 based on the consumption data inputted from the sensor that monitors the process cartridge 2.

When the replacement judging unit 404 has judged that it is time to replace the process cartridge 2, after having the operation of the image forming apparatus 5 stopped, the encrypting unit 405 performs an encryption processing on the specific data stored in the storage unit 451 included in the process cartridge 2. Likewise, the encrypting unit 405 also performs an encryption processing when the image forming apparatus 5 has shifted into a standby mode.

It should be noted that a key used for encrypting or decrypting a predetermined piece of data is one of keys each of which is unique to a different one of pieces of maintenance ID information. Such a key that is unique to one of the pieces of maintenance ID information may be any key as long as it is possible only for the image forming apparatus 5 and a recycling apparatus 500, that are able to authenticate the maintenance ID information, to perform the decryption processing and the encryption processing.

The encryption judging unit 408 judges whether an encryption processing has been performed on the specific data in the process cartridge 2. It is acceptable to use any method to judge whether the specific data has been encrypted or not. In the first embodiment, when a new process cartridge 2 is attached to the image forming apparatus 5, the encryption judging unit 408 reads data out of the process cartridge 2 in order to judge whether an encryption processing has been performed on the data.

When the process cartridge 2 has never been detached from the image forming apparatus 5 since an immediately preceding judgment, the encryption judging unit 408 judges whether an encryption processing has been performed by searching the history data stored in the main memory (RAM 43), using the maintenance ID information of the process cartridge 2 as a key. As described here, because the encryption judging unit 408 is able to judge whether an encryption processing has been performed by referring to the history data, it is possible to judge easily whether an encryption processing has been performed, and it is also possible to make a load related to the judgment processing lighter.

When the encryption judging unit 408 has judged that an encryption processing has been performed on the data, the decrypted information judging unit 411 judges which piece of information, out of the specific data encrypted and stored in the storage unit 451 included in the process cartridge 2, is related to the control operation of the image forming apparatus 5. Subsequently, the decrypted information judging unit 411 judges that the piece of information judged to be related to the control operation is a piece of information on which a decryption processing is to be performed. Because of this arrangement wherein the decrypted information judging unit 411 is provided, no decryption processing is performed on information that is not related to the control operation. With this arrangement, it is possible to further enhance the security level and to reduce the procedure required in the decryption processing.

The decrypting unit 406 performs a decryption processing, based on the maintenance ID information, on the piece of information that has been judged by the decrypted information judging unit 411 that a decryption processing should be performed.

When the process cartridge 2 is connected to the image forming apparatus 5, and the judging unit 403 judges that the process cartridge 2 is usable, and if no encryption processing has been performed on the specific data stored in the storage unit 451 included in the process cartridge 2, the notifying unit 407 notifies that no encryption processing has been performed on the specific data. For example, the notifying unit 407 makes a notification by displaying on the control panel that no encryption processing has been performed on the data. As another example, the notifying unit 407 may notify a user that no encryption processing has been performed on the data by sending an electronic mail, or the like.

The update processing unit 409 performs an update processing on the specific data stored in the storage unit 451 included in the process cartridge 2 and on data stored in the HDD 36. The update processing will be described in detail later. The control processing unit 410 performs the control operation of the image forming apparatus 5, for example.

The following section explains the process cartridge 2. The process cartridge 2 includes the storage unit 451 and the connection processing unit 452. The storage unit 451 included in the process cartridge 2 stores therein the maintenance ID information and data.

The usage history information includes history data that is based on the control operation performed by the image forming apparatus 5. The usage history information is automatically updated/added by the connection processing unit 401 included in the image forming apparatus 5, every time the image forming apparatus 5 performs a processing. The recycling apparatus 500 judges whether it is possible to perform a recycling processing by referring to the usage history information. The information included in the usage history information will be described in detail later.

The connection processing unit 452 connects with either the image forming apparatus 5 or the recycling apparatus 500. The connection processing unit 452 performs a receiving processing of the information inputted from either the image forming apparatus 5 or the recycling apparatus 500, and performs a writing processing and/or an update processing on the storage unit 451 using the received information. The connection processing unit 452 performs a transmitting processing to the process cartridge 2, using the information read out of the storage unit 451.

Figure 5:
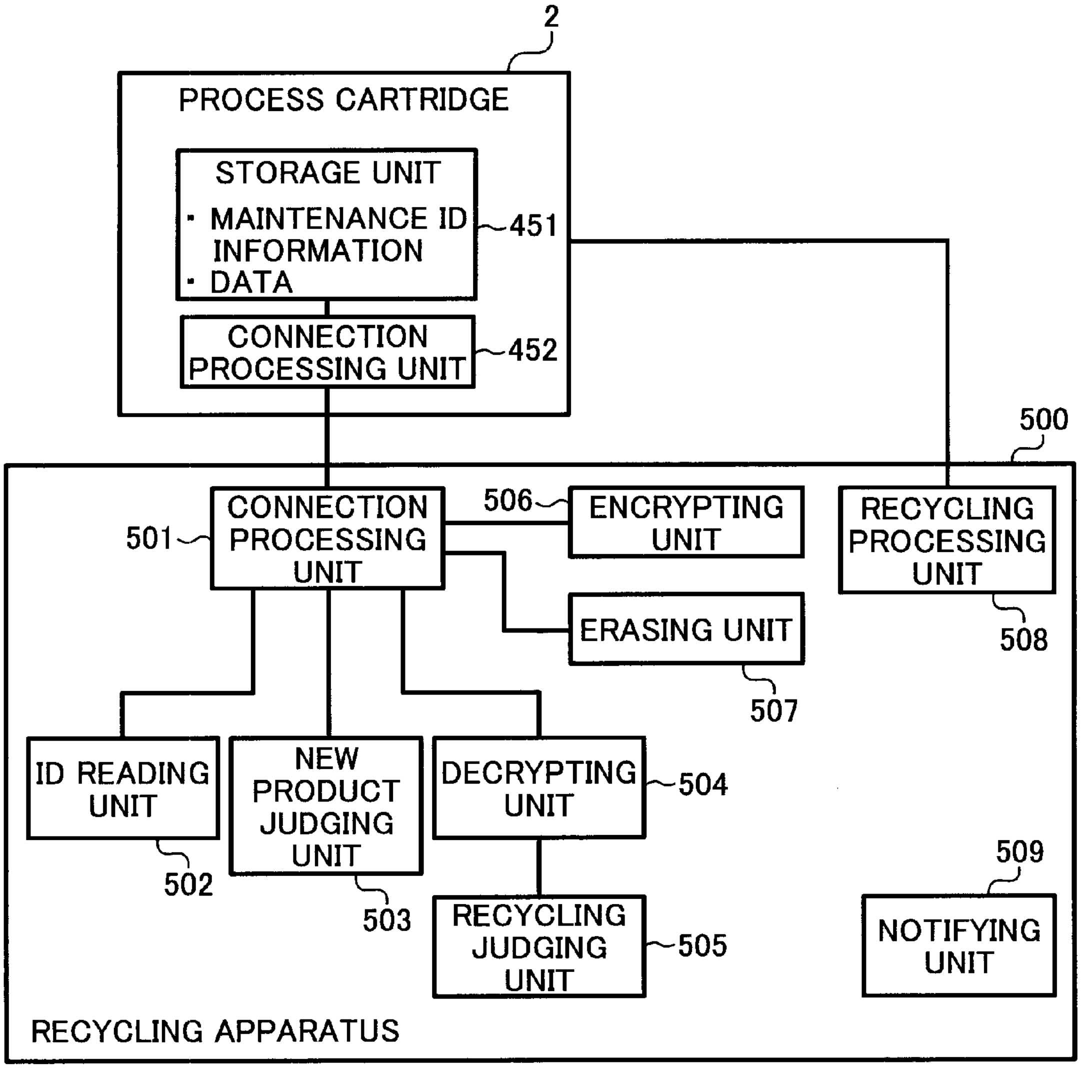
FIG. 5 is a diagram of block configurations of the process cartridge and a process cartridge recycling apparatus according to the first embodiment.

FIG. 5 is a diagram of block configurations of the process cartridge 2 and the recycling apparatus 500 that performs a recycling processing of the process cartridge 2. As shown in the drawing, the recycling apparatus 500 includes a connection processing unit 501, an ID reading unit 502, a new product judging unit 503, a decrypting unit 504, a recycling judging unit 505, an encrypting unit 506, an erasing unit 507, a recycling processing unit 508, and a notifying unit 509. The recycling apparatus 500 judges whether it is possible to recycle the process cartridge 2 and if the process cartridge 2 is judged to be not recyclable, the recycling apparatus 500 performs a recycling processing. Since the process cartridge 2 is explained above, the explanation will not be repeated here.

The connection processing unit 501 performs a receiving processing of the information inputted from the process cartridge 2 and a transmitting processing of the information outputted to the process cartridge 2. The ID reading unit 502 reads the maintenance ID information stored in the storage unit 451 included in the process cartridge 2.

The new product judging unit 503 judges whether the process cartridge 2 has usage history information. When the new product judging unit 503 has judged that the process cartridge 2 has no usage history information, the new product judging unit 503 further judges whether the process cartridge 2 being connected is new (i.e. unused).

When the process cartridge 2 has usage history information, the decrypting unit 504 reads the encrypted specific data from the storage unit 451 included in the process cartridge 2 and decrypts the encrypted specific data.

The recycling judging unit 505 judges whether it is possible to recycle the process cartridge 2 based on the decrypted specific data.

The recycling processing unit 508 performs a recycling processing on the process cartridge 2 that has been judged by the recycling judging unit 505 to be recyclable.

After the recycling processing is performed, the encrypting unit 506 performs an encryption processing on the specific data stored in the storage unit 451 included in the process cartridge 2. The encrypting unit 506 does not have to encrypt data other than the specific data. The specific data on which an encryption processing is performed will be explained in detail later. With this arrangement wherein an encryption processing is performed only on data that requires encryption, it is possible to make a load related to the encryption processing lighter.

The erasing unit 507 erases the specific data stored in the storage unit 451 included in the process cartridge 2 that has been judged by the recycling judging unit 505 to be not recyclable. The notifying unit 509 notifies a user that, for example, the process cartridge that is connected is a wrong process cartridge.

Next, the control operation of the image forming apparatus 5 that has the configuration described above will be explained, with reference to a flow chart in FIG. 6 and FIG. 7. Also, the control operation of the recycling apparatus 500 will be explained, with reference to a flow chart in FIG. 8. It should be noted that in the flow charts in the following description, the process cartridge 2 is used as a replacement part that can be attached and detached to and from the image forming apparatus 5.

Figure 6A:
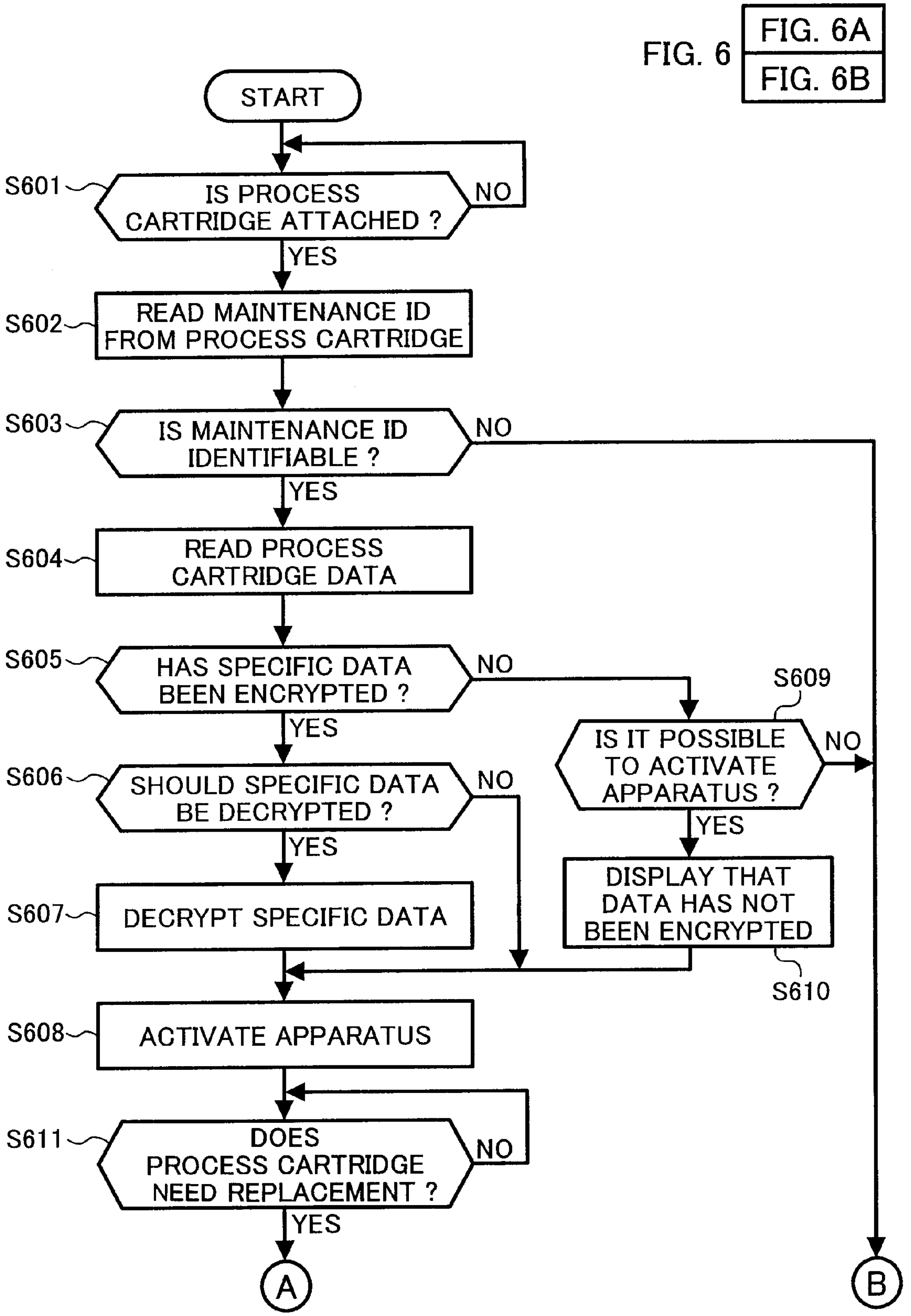
FIG. 6 is a flow chart of the processing procedure to be performed after a process cartridge is attached to an image forming apparatus.
Figure 6B:
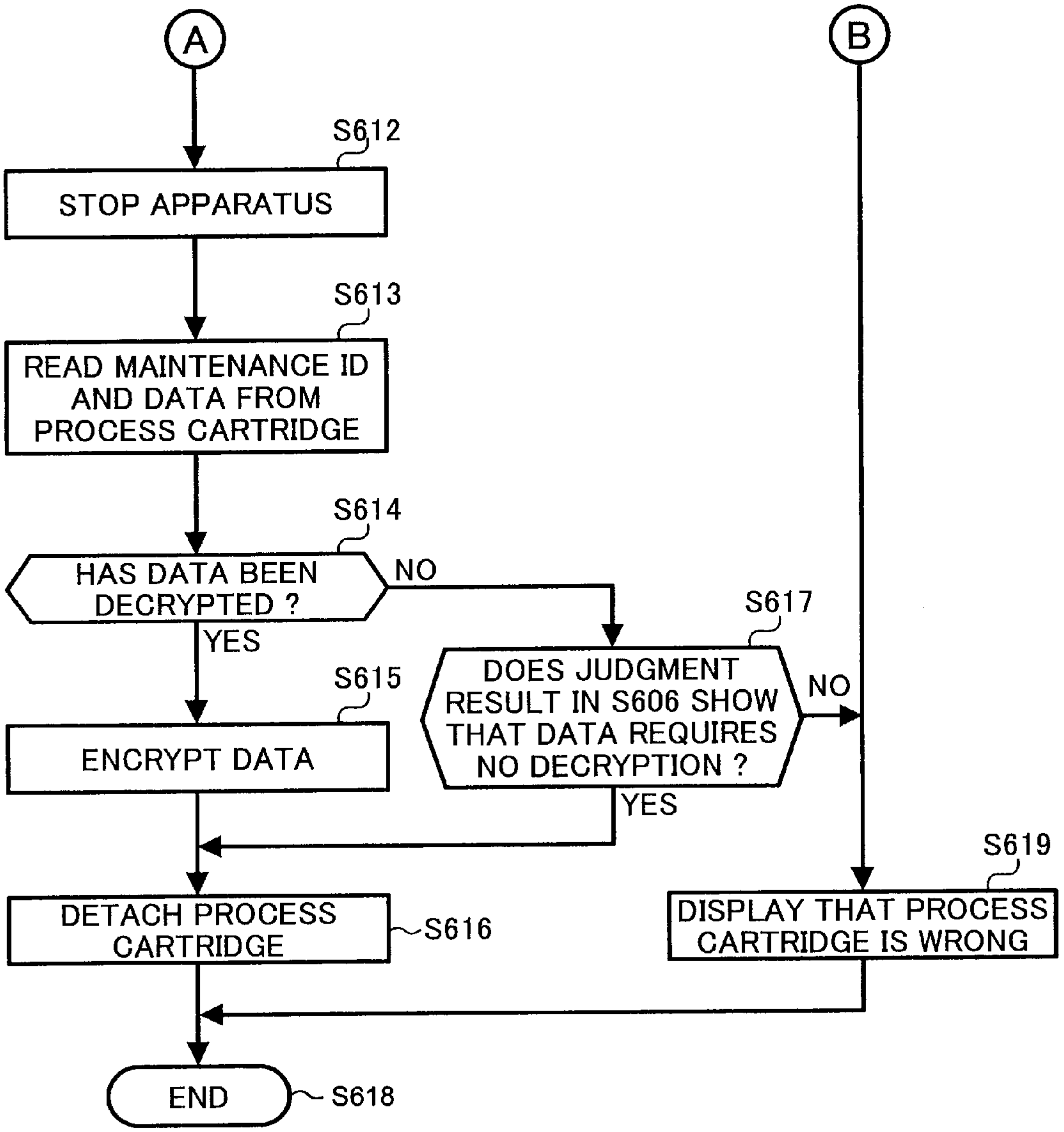
Figure 7:
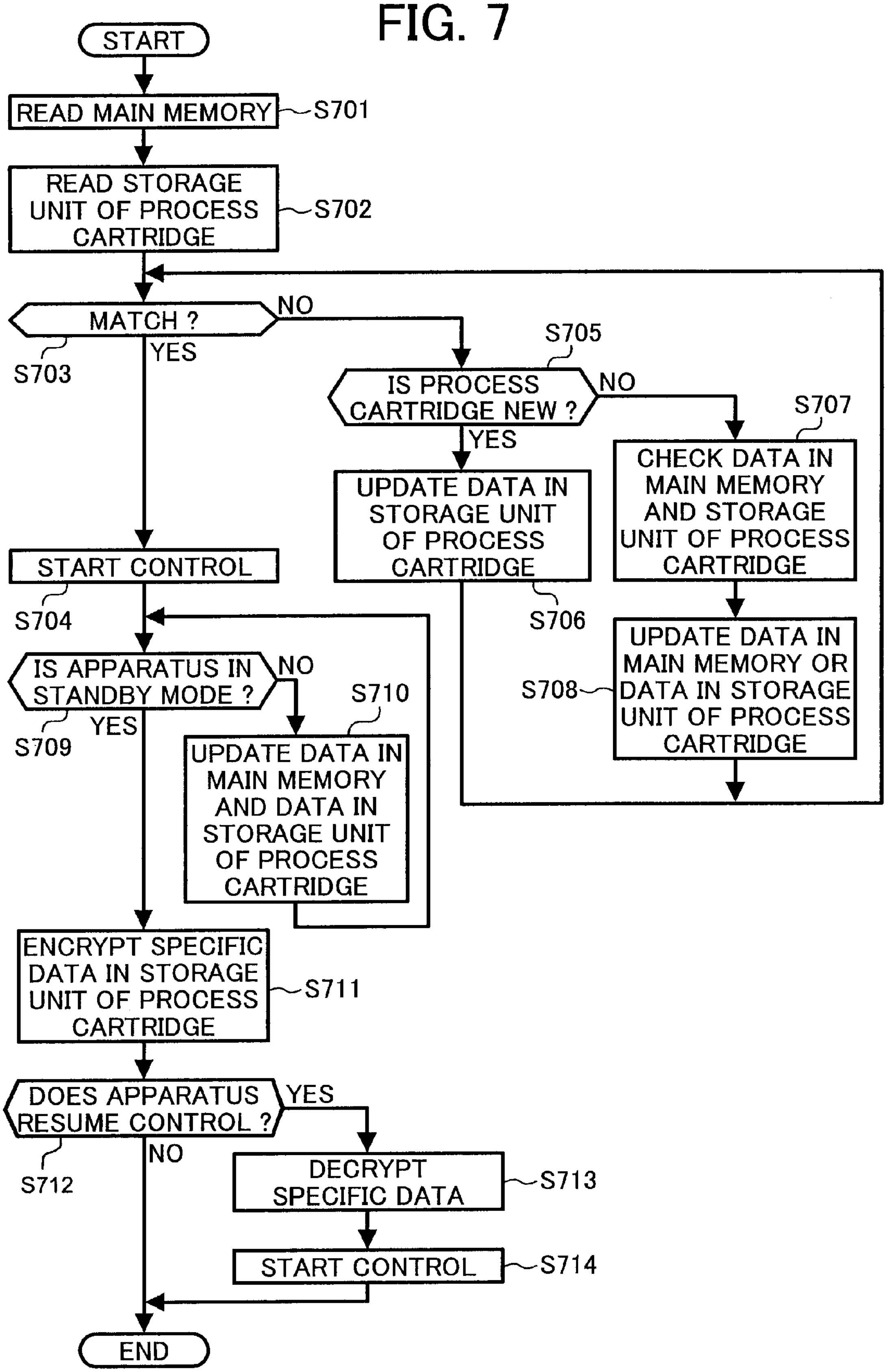
FIG. 7 is a flow chart of the processing procedure to update data stored in a storage unit included in a process cartridge.
Figure 8:
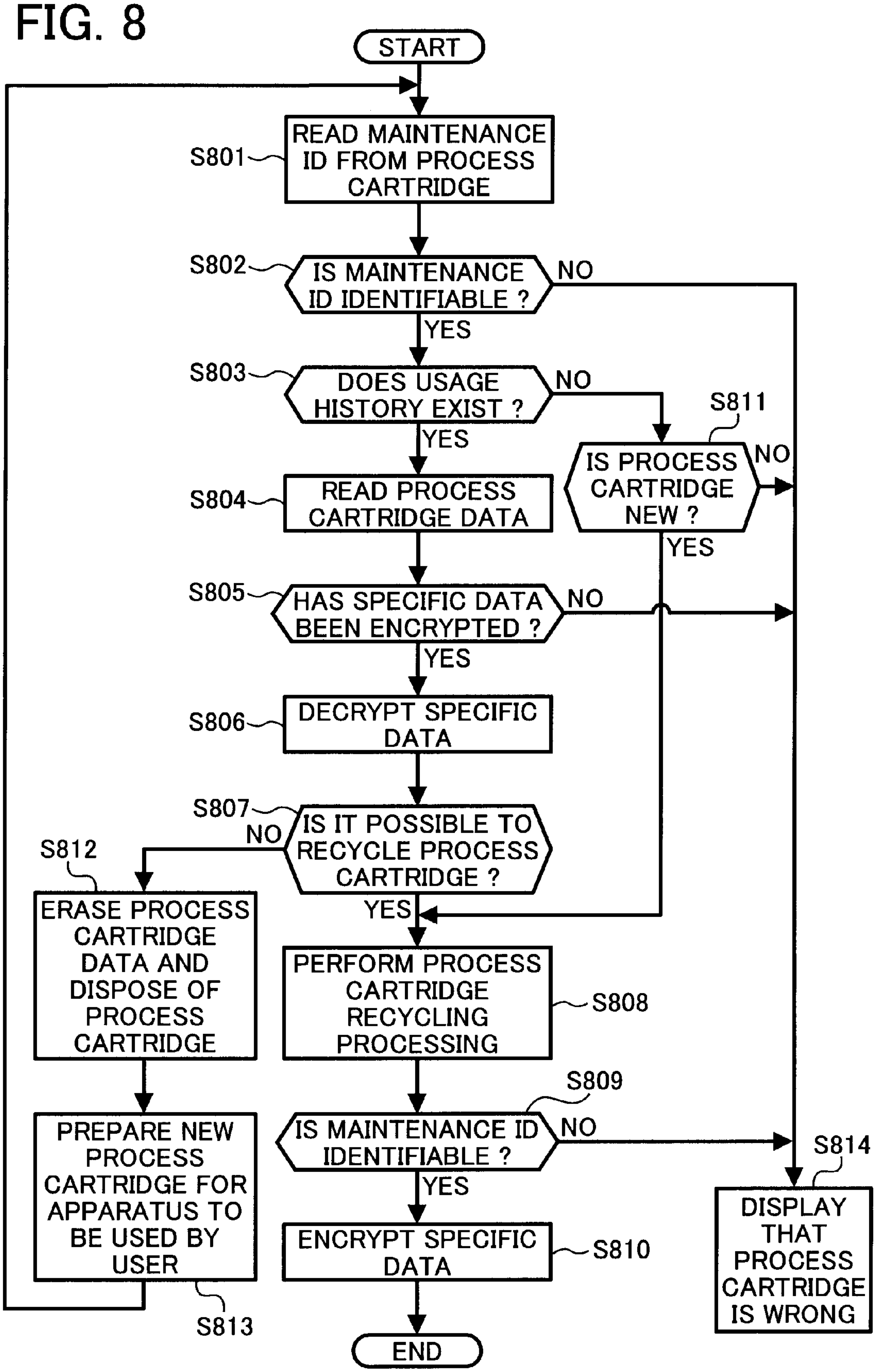
FIG. 8 is a flow chart of the processing procedure for recycling or disposing of a process cartridge at a recycling center after the process cartridge is detached from the image forming apparatus.

FIG. 6 is a flow chart of the procedure to be performed after the process cartridge 2 is attached to the image forming apparatus 5. The general scheme of FIG. 7 will be described later. FIG. 8 is a flow chart of the procedure for recycling or disposing of the process cartridge 2, to be performed at a recycling center after the process cartridge 2 is detached from the image forming apparatus 5.

The CPU 41 in the engine unit 40 included in the image forming apparatus 5 executes the flow shown in FIG. 6. To start with, the CPU 41 executes the image forming program so that the configuration shown in FIG. 4 is realized.

The flow chart illustrates the following procedure: After the process cartridge 2 is attached, the control processing unit 410 identifies the maintenance ID information of the process cartridge 2, and, if an encryption processing has been performed on the data stored in the process cartridge 2, a decryption processing is performed on the data, and the image forming apparatus 5 is activated. Later on, when it is judged that the process cartridge 2 needs to be replaced because, for example, the life of the product of the process cartridge 2 comes to the end after image forming operations have been performed for a period of time, the image forming apparatus 5 is stopped so that the maintenance ID information is read, and an encryption processing is performed on the data stored in the process cartridge 2.

Firstly, the control processing unit 410 judges whether the process cartridge 2 is attached to the image forming apparatus 5 (step S601). Secondly, when the process cartridge 2 is confirmed to be attached to the image forming apparatus 5, the ID reading unit 402 reads the maintenance ID information stored in the storage unit 451 (the memory tab) included in the process cartridge 2 (step S602).

The judging unit 403 then performs an authentication process on the maintenance ID information (step S603). If the judging unit 403 has authenticated the maintenance ID information, the process cartridge 2 is judged to be usable (step S603: Yes), and the connection processing unit 401 reads the data stored in the process cartridge 2 (step S604). The encryption judging unit 408 then judges whether an encryption processing has been performed on the specific data (step S605).

If the judging unit 403 is not able to identify the maintenance ID information (step S603: No), it is judged that the process cartridge that is attached is a wrong process cartridge. The notifying unit 407 displays on the control panel that the process cartridge being attached is a wrong process cartridge so as to notify the user (step S619).

Next, when the encryption judging unit 408 judges that an encryption processing has been performed on the specific data, the decrypted information judging unit 411 judges whether the specific data is data on which a decryption processing should be performed (step S606). If it is judged that a decryption processing should be performed, the decrypting unit 406 performs a decryption processing on the encrypted data (step S607).

Subsequently, the main body of the image forming apparatus 5 is activated (step S608). After the image forming apparatus 5 is activated, an image forming processing and the like are to be performed, although this processing is not shown in the drawings, and the specific data stored in the storage unit in the process cartridge 2 is updated, as necessary, for example. Further, when the image forming apparatus 5 comes into a standby mode, an encryption processing is also performed on the specific data.

It should be noted here that data that does not require a decryption processing is, for example, data that is not directly related to the control of the image forming operation, e.g. user information stored in the process cartridge 2.

When the encryption judging unit 408 judges that the specific data has not been encrypted (step S605: No), it is judged whether it is possible to activate the image forming apparatus 5 even if the image forming apparatus 5 is in that state (step S609).

If it is possible to activate the image forming apparatus 5 (step S609: YES), the notifying unit 407 displays on the control panel, or the like, that the data has not been encrypted so that the user realizes the situation, before the image forming apparatus 5 is activated (step S610).

On the other hand, if it is not possible to activate the image forming apparatus 5 (step S609: No), it is judged that a wrong process cartridge is attached, and the notifying unit 407 displays that the process cartridge being attached is a wrong process cartridge (step S619).

Next, when the image forming apparatus 5 is activated and performs an image forming operation, the replacement judging unit 404 uses a sensor and monitors whether the process cartridge 2 needs to be replaced due to the life of the product of the process cartridge 2 coming to the end or the like (step S611). If it is judged that the process cartridge 2 needs to be replaced from the consumption data inputted from the sensor, the image forming apparatus 5 will be stopped (step S612).

Subsequently, the connection processing unit 401 reads the data stored in the process cartridge 2 (step S613), and the encrypting unit 405 performs an encryption processing on the specific data on which the decryption processing has been performed in step S607 (steps S614 and S615).

At this point, there is no need to perform any particular processing if no decryption processing was performed on the data in step S606, or the data was encrypted after the image forming apparatus 5 shifted into a standby mode in step S608. In other words, there is no need to perform any particular processing if the data remains encrypted (step S617).

Then, if there is some data on which an encryption processing has been performed or there is some data that cannot be decoded besides the data that has been judged to require no decryption processing in step S606 and besides the data that has been encrypted after the image forming apparatus 5 shifted into a standby mode in step S608, the notifying unit 407 displays that the attached process cartridge is a wrong process cartridge so as to notify the user (step S619). Due to this procedure described above, the process cartridge 2 is detached from the image forming apparatus 5 with the specific data in the state of being encrypted (step S616).

Next, when the process cartridge 2 is detached from the image forming apparatus 5 or when information indicating that the attached process cartridge is a wrong process cartridge is displayed, the processing of the image forming apparatus 5 is completed. Subsequently, the user sends the process cartridge 2 to a recycling center (step S618).

As additional information, although user information is used as an example of data that does not require a decryption processing in step S606 of the flow chart, needless to say, a decryption processing is to be performed on even such information if it is judged that the information is related to the control of the image forming operation.

As described above, when it is time to replace the process cartridge 2, the encryption processing is performed on the information after the image forming apparatus 5 is stopped. With this arrangement, it is possible to maintain security even after the replacement part is detached from the image forming apparatus 5.

In addition, although it is not shown in FIG. 6, after the image forming apparatus 5 is activated in step S608, in some cases the data stored in the storage unit 451 included in the process cartridge 2 may be updated. FIG. 7 is a flow chart of the processing procedure to update the data in the process cartridge 2.

Firstly, after the image forming apparatus 5 is activated, the update processing unit 409 starts an optimization process of image forming conditions. At this time, the update processing unit 409 reads information related to the use of the control data (for example, the image fixing process and the detection of the amount of the toners remaining) from the main memory (RAM 33) (step S701).

Next, the connection processing unit 401 reads the data stored in the storage unit 451 included in the process cartridge 2 (step S702). The update processing unit 409 then judges whether the data read by the connection processing unit 401 matches the control data read from the main memory (step S703). When the data read from the main memory matches the data read from the storage unit 451 (step S703: Yes), no update processing is performed, but the control processing unit 410 starts the individual control using the control data (step S704).

As examples of the case where the control data read from the main memory does not match the data stored in the storage unit 451 of the process cartridge 2, there are following possibilities: (1) The cartridge is new (i.e. unused), and the data stored in the memory remains as an initial set value; (2) The data in the cartridge memory has not been updated and remains as old data; and (3) the data in the apparatus itself has not been updated and remains as old data.

When the data read from the main memory does not match the data read from the storage unit 451 (step S703: No), the update processing unit 409 judges whether the process cartridge 2 is new (i.e. unused)(step S705). When having judged that the process cartridge 2 is new (i.e. unused) (step S705: Yes), the update processing unit 409 updates the data stored in the storage unit 451 included in the process cartridge 2 (step S706).

On the other hand, when having judged that the process cartridge 2 is not new (i.e. not unused) (step S705: No), the update processing unit 409 checks which one of the data in the main memory and the data in the storage unit 451 of the process cartridge 2 is old data (step S707). The update processing unit 409 then updates whichever one of the data in the main memory and the data in the storage unit 451 of the process cartridge 2 that is old data (step S708). Thus, the control operation in the next stage is performed.

The update processing unit 409 then checks whether the image forming apparatus 5 is in a standby mode (step S709). When the image forming apparatus 5 is not in the standby mode (step S709: No), and if an image forming operation has been performed during the control operation, the update processing unit 409 updates the data in the main memory and the data stored in the storage unit 451 included in the process cartridge 2 (step S710).

On the other hand, when the image forming apparatus 5 is in a standby mode (step S709: Yes), the encrypting unit 405 performs an encryption processing on the specific data stored in the storage unit 451 included in the process cartridge 2 (step S711).

Subsequently, the control processing unit 410 judges whether the image forming apparatus 5 resumes the control, based on, for example, an input from a user (step S712). When the image forming apparatus 5 does not resume the control (step S712: No), no particular processing will be performed.

When the control processing unit 410 has judged that the image forming apparatus 5 resumes the control (step S712: Yes), the decrypting unit 406 performs a decryption processing on the specific data that has been encrypted in step S711 and is stored in the storage unit 451 of the process cartridge 2 (step S713). Next, the control processing unit 410 starts the individual control using the control data including the data on which the decryption processing has just been performed (step S714). In addition, although the procedure after step S714 is not shown in the drawings, the data may be updated as shown in step S710. When the apparatus comes into a standby mode, an encryption processing may be performed on the specific data stored in the storage unit 451 of the process cartridge 2, as shown in step S711.

In this manner, the storage unit 451 of the process cartridge 2 is able to store therein the most updated data. Further, an encryption processing is performed on the most updated data stored in the storage unit 451 of the process cartridge 2 after the image forming apparatus 5 is stopped, according to the processing procedure shown in FIG. 6.

As described above, the information related to the specification of the image forming apparatus 5 is stored in the storage unit included in a replacement part such as the process cartridge 2 and updated. When the image forming apparatus 5 is in a standby mode, an encryption processing is performed on the stored information so that security is maintained even if the replacement part is detached from the image forming apparatus 5.

While the image forming apparatus 5 is performing the image forming operation, the data related to the amount of the toners remaining and the image fixing process information is updated sequentially. The characteristics of the present invention lie in that such updated information is stored into the storage unit included in the replacement part so that it is possible to perform an encryption processing on the information.

The flow chart shown in FIG. 8 illustrates the procedure executed at the recycling center of the process cartridge by the recycling apparatus 500 that is able to read and write maintenance ID information and data from and to the storage unit 451 (the memory tab) of the process cartridge 2. The procedure includes: identifying the maintenance ID information of the process cartridge detached from the image forming apparatus 5, performing a decryption processing on the data on which an encryption processing has been performed and that is stored in the process cartridge, performing a recycling processing on the decrypted data, and then the recycling apparatus 500 performing an encryption processing on the data again.

First of all, the ID reading unit 502 reads the maintenance ID information from the process cartridge 2 (step S801). Then, the ID reading unit 502 judges whether it is possible to identify the read maintenance ID information (step S802). When it is judged that the ID reading unit 502 has identified the maintenance ID information (step S802: Yes), the new product judging unit 503 judges whether usage history information exists (step S803). When the new product judging unit 503 has judged that no usage history information exists (step S803: No), the new product judging unit 503 judges whether the process cartridge is new (i.e. unused) (step S811). Thus, it is preferable to have usage history information encrypted in such a manner that it is possible to recognize if usage history data exists or not without performing a decryption processing on the usage history data.

When it is not possible to identify the maintenance ID information (step S802: No) and when the process cartridge 2 has no usage history information but the process cartridge 2 is not new either (step S811: No), the process cartridge 2 is judged to be a wrong process cartridge. The notifying unit 509 displays information to that effect so as to notify the user (step S814).

On the other hand, when the new product judging unit 503 has identified the maintenance ID information and has confirmed that usage history information exists (step S803: Yes), the connection processing unit 501 reads the data stored in the process cartridge (step S804), and the decrypting unit 504 judges whether an encryption processing has been performed on the specific data (step S805). When no encryption processing has been performed on the specific data (step S805: No), the process cartridge is judged to be a wrong process cartridge, and the notifying unit 509 displays information to that effect so as to notify the user (step S814).

When having judged that an encryption processing has been performed on the specific data (step S805: Yes), the decrypting unit 504 performs a decryption processing on the specific data (step S806). At this time, it is also acceptable to have an arrangement wherein the decrypting unit 504 performs the decryption processing only on information that is necessary for judging whether it is possible to recycle the process cartridge.

Subsequently, the recycling judging unit 505 judges whether it is possible to recycle the process cartridge, based on the data that has been decrypted (step S807). For example, when there is no toner remaining, it is possible to recycle the process cartridge after toners are refilled.

When it has been judged that it is possible to recycle the process cartridge (step S807: Yes), the recycling processing unit 508 performs a recycling processing (step S808).

On the other hand, when it has been judged that it is not possible to recycle the process cartridge (step S807: No), the erasing unit 507 erases the data stored in the storage unit 451 (the memory tab) included in the process cartridge. Subsequently, a disposal processing of the process cartridge is performed (step S812).

After that, a new process cartridge is prepared for the image forming apparatus 5 to be used by a user (step S813). On the other hand, when the decrypting unit 504 judges that no encryption processing has been performed on the data (step S805: No), the process cartridge is judged to be a wrong process cartridge.

When the new product judging unit 503 has detected that the attached process cartridge is new (i.e. unused) (step S811: Yes), the recycling processing unit 508 performs a recycling processing (step S808). The encrypting unit 506 checks the maintenance ID information again after the recycling processing is completed (step S809), and performs an encryption processing on the specific data (step S810). Subsequently, the process cartridge is attached to the image forming apparatus 5 to be used by the user.

According to the first embodiment, because the recycling apparatus 500 encrypts and decrypts the data, and also erases the data using the processing procedure described above, it is possible to maintain reliability even when a replacement part such as the process cartridge 2 is detached from the image forming apparatus 5 so as to be recycled or to be disposed of.

The specific data on which the encryption processing, the reading processing, and the decryption processing are to be performed includes the types of data shown below, which are specified based on the need of protecting security of the information related to privacy:

(1) Information related to users (2) Information related to the service companies (3) Information related to the selling companies (4) Information related to the manufacturing companies (5) Information related to the specification for specific users The types of information listed under (2), (3), and (4) denote service companies, selling companies, and manufacturing companies of the image forming apparatus or the process cartridge. The type of information listed under (5) is applicable when, for example, the material of the toner or the life of the product of the toner is different from the standard specification. Such a type of information is also considered to relate to the user's privacy and is subject to security protection. Additionally, other types of data that can be read from an image forming apparatus and is subject to security protection are the types of data shown below, which are specified for the purpose of preventing tampering of information related to quality and reliability of process cartridges:

(6) Manufacturing information including a year-month-day of the manufacturing date, the manufacturing lot, and the name of the manufacturing factory (7) Usage history information including the time period of the use, the total number of sheets printed, the number of times the toners have been re-supplied, the number of times the toners have been recycled, the number of revolution of one of the drum, the developing roller, and the electrically charged roller, the number of revolution of the image fixing roller, the upper limit value of one of the time period of the use, the total number of sheets copied, and the number of times the toners have been recycled (8) Control information including the time period for applying high voltages on electric charges, the set value of the electric charge voltage or the development bias voltage, and the set value of the image fixation temperature.

In the first embodiment, the encryption key and the decryption key used for performing the encryption processing and the decryption processing on the information stored in the storage unit of the replacement part are not limited to the keys that are unique to the maintenance ID information of the replacement part; it is possible to change these keys. Additionally, it is possible to have an arrangement wherein an encryption processing is performed on a predetermined piece of data after the image forming apparatus has shifted into an energy saving mode, instead of a standby mode.

Further, in the first embodiment, the encryption processing is performed when it is time to replace the process cartridge 2 or after the image forming apparatus 5 has shifted into a standby mode or an energy saving mode; however, the present invention is not limited to these arrangements.

For example, it is acceptable to have an arrangement wherein an encryption processing is performed on the specific data stored in the process cartridge 2 after the electric power of the image forming apparatus 5 is turned off. As an example of how to keep having electric power supply after the electric power of the image forming apparatus 5 is turned off, it is acceptable to ensure that electricity is supplied to the HDD 36 for a predetermined time period by using a capacitor, or the like, provided within the image forming apparatus 5. With this arrangement, after the electric power of the image forming apparatus 5 is turned off, even if the process cartridge 2 is detached from the image forming apparatus 5, the data stored in the replacement part remains encrypted. Thus, it is possible to further enhance the security level.

In the first embodiment, the data is stored in the storage unit included in the process cartridge 2; however, the storage unit does not have to be included in the process cartridge 2. It is acceptable to have an arrangement wherein a storage unit is provided within a toner cartridge or an image fixing unit, for example, so that maintenance ID information and other data on which it is possible to perform an encryption processing are stored in the storage unit.

Further, it is acceptable to have an arrangement wherein encryption/decryption keys are changed every time a replacement part is attached to the image forming apparatus 5. By changing the keys in this manner, it is possible to further enhance the security level of the information. It should be noted, however, that it is necessary to have an arrangement, in such a case also, wherein it is possible for the CPU 41 included in the body of the image forming apparatus 5 and the recycling apparatus 500 to identify the encryption/decryption keys for each of the different replacement parts, based on the maintenance ID of each replacement part.

When it is judged that it is necessary to replace a replacement part that can be attached and detached to and from the image forming apparatus 5, it is possible to maintain security of information that requires security protection by performing an encryption processing on the specific data stored in the replacement part.

When it has been detected that the specific data stored in a replacement part has not been encrypted after the replacement part is attached to the image forming apparatus 5, it is possible to avoid damaging the reliability of the image forming apparatus 5, by notifying the user that the specific data is not encrypted.

Furthermore, when the data on which an encryption processing has been performed and that is stored in a replacement part is not related to the control of the image forming operation, no decryption processing is to be performed on the stored encrypted data. Thus, it is possible to shorten the processing time required for the image forming operation.

In addition, by having an arrangement wherein data on which it is possible to perform an encryption processing based on maintenance ID information is stored in a storage unit provided within one of a process cartridge, a toner cartridge, and an image fixing unit, it is possible to properly manage these parts that include various types of process information and also to protect security of the information.

By having an arrangement wherein the information related to the user, the service companies, the selling companies, and the manufacturing companies and the information related to the user specification are stored in a replacement part as information on which it is possible to perform an encryption processing, it is possible to properly manage replacement parts and also to protect security of the information related to privacy.

By storing the manufacturing information, the usage history information, and the control specification information into a replacement part as information on which it is possible to perform an encryption processing, it is possible to properly manage replacement parts, and also to prevent illegitimate tampering, or the like, of these types of information. With this arrangement, it is possible to avoid having the quality and the reliability of the replacement parts damaged by the reading of the information from the image forming apparatus 5.

When a recycling processing is performed after a replacement part is detached from the image forming apparatus 5, a decryption processing is performed at the recycling center based on the maintenance ID information of the replacement part. This way, the information stored in the replacement part remains encrypted all the while between the time when the replacement part is detached and the time when the replacement part is transported to the recycling center. Thus, it is possible to prevent illegitimate copying or tampering by a third party and to enhance the security level.

Because an encryption processing is performed on the stored specific data after a replacement part is recycled at the recycling center, the stored information remains encrypted all the while until the replacement part is attached to the image forming apparatus to be used by a user. Thus, it is possible to enhance the security level.

If it is judged that it is not possible to recycle the replacement part at the time when the recycling processing of the replacement part is to be performed, the data stored in the replacement part is erased. With this arrangement, it is possible to prevent illegitimate copying or tampering by a third party even after the replacement part is disposed of, and to enhance the security level.

Further, when a replacement part is attached to the image forming apparatus, the CPU 41 included in the body of the image forming apparatus detects the attachment. After the attachment is detected, a decryption processing is performed on the specific data on which an encryption processing has been performed and that is stored in the process cartridge 2. Thus, it is possible to shorten the processing time required for the image forming operation without degrading the security level.

Furthermore, the first embodiment provides an arrangement in which the user is notified that an attached replacement part is wrong when pieces of maintenance ID information do not match each other. By referring to the notification, the user is able to realize that the attached replacement part is not usable. Thus, it is possible to avoid damaging the reliability of the image forming apparatus 5.

The replacement part of the present invention is not limited to a process cartridge, and it may be any part. In the second embodiment, an HDD is considered as the replacement part.

The system configuration according to the second embodiment is the same as the one according to the first embodiment; therefore, explanation will be omitted. The second embodiment is different from the first embodiment in that the MPU 31 performs the processing, instead of the CPU 41, which performs the processing according to the first embodiment.

According to the second embodiment, an encryption processing is performed on the HDD 36 after the image forming apparatus has shifted into a standby mode or an energy saving mode. The procedures for performing an encryption processing and performing an updating processing on a predetermined piece of data stored in the HDD 36 are the same as the ones shown in FIG. 7 according to the first embodiment; therefore, explanation will be omitted.

Further, an arrangement is acceptable in which the time to replace the HDD 36 is also judged like the process cartridge 2 according to the first embodiment. As a reference used for judging the time to replace the HDD 36, for example, it is acceptable to judge that it is time to replace the HDD 36 when abnormal noise is included in the sound that the HDD 36 makes.

The second embodiment is not limited to the arrangement wherein an encryption processing is performed only on the HDD 36. For example, it is acceptable to have an arrangement wherein an encryption/decryption processing is performed on each of the HDD 36 and the process cartridge 2 that can be both attached and detached from and to the image forming apparatus 5.

In addition, although the maintenance ID information is a number that is unique to each process cartridge 2 according to the second embodiment, it is acceptable to use any type of information as long as it is possible for the image forming apparatus 5 to identify the process cartridge 2 being connected.

As described above, the HDD data remains encrypted as long as the image forming apparatus 5 is in a standby mode or an energy saving mode or it is time to replace the HDD 36. Thus, even if a third party forcefully detaches the HDD 36 from the main body of the image forming apparatus 5 while the image forming apparatus 5 is in a standby mode, it is not possible for the third party to make an illegitimate copy of the HDD data.

According to the embodiments described above, the image forming apparatus 5 may be an apparatus in which another method, for example, an ink jet method is used. In such a case, the replacement part may be an ink cartridge or the like, and it is possible to apply he same processing to such a replacement part.

It should be noted that the image forming program executed by the image forming apparatus 5 and a recycling processing program executed by the recycling apparatus 500 according to the embodiments described above are provided as being incorporated into a ROM or the like in advance.

Furthermore, it is also acceptable to have an arrangement wherein the image forming program executed by the image forming apparatus 5 and the recycling processing program executed by the recycling apparatus 500 according to the embodiments described above are provided as being recorded on a computer-readable recording medium such as a CD-ROM, a flexible disc (FD), a CD-R, a DVD (Digital Versatile Disk) in a file that is in an installable format or an executable format.

In addition, it is also acceptable to have an arrangement wherein the image forming program executed by the image forming apparatus 5 and the recycling processing program executed by the recycling apparatus 500 according to the embodiments described above are provided as being stored in a computer connected to a network like the Internet and being downloaded via the network. Also, it is also acceptable to have an arrangement wherein the image forming program executed by the image forming apparatus 5 and the recycling processing program executed by the recycling apparatus 500 according to the embodiments described above are provided or distributed via a network like the Internet.

The image forming program executed by the image forming apparatus 5 according to the embodiments described above has a module configuration that includes the constituent elements described above (i.e. the connection processing unit, the ID reading unit, the judging unit, the replacement judging unit, the encrypting unit, the decrypting unit, the notifying unit, the encryption judging unit, the update processing unit, and the control processing unit). In the actual hardware configuration, these constituent elements are loaded onto a main storage device when the CPU (a processor) reads the image forming program from the ROM and executes the program, so that the connection processing unit, the ID reading unit, the judging unit, the replacement judging unit, the encrypting unit, the decrypting unit, the notifying unit, the encryption judging unit, the update processing unit, and the control processing unit are generated on the main storage device.

The recycling processing program executed by the recycling apparatus 500 according to the embodiments described above has a module configuration that includes the constituent elements described above (i.e. the transmission reception processing apparatus, the ID reading unit, the new product judging unit, the decrypting unit, the recycling judging unit, the encrypting unit, the erasing unit, the recycling processing unit, and the notifying unit). In the actual hardware configuration, these constituent elements are loaded onto a main storage device when the CPU (a processor) reads the recycling processing program from the ROM and executes the program, so that the transmission reception processing apparatus, the ID reading unit, the new product judging unit, the decrypting unit, the recycling judging unit, the encrypting unit, the erasing unit, the recycling processing unit, and the notifying unit are generated on the main storage device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

a connecting unit configured to be connectable to a replacement part, the replacement part having a storage unit that stores therein information including identification information unique to the replacement part;

a replacement judging unit that judges whether the replacement part that is connected to the connecting unit needs replacement based on consumption information indicative of how much the replacement part has been consumed;

an identification information reading unit that reads the identification information in the storage unit of the replacement part when the replacement judging unit judges that the replacement part needs replacement;

a main memory that stores therein history data for encryption and/or decryption processing performed on the replacement part;

an encryption judging unit that judges whether an encryption processing has been performed with respect to a predetermined piece of information by searching the history data stored in the main memory, using the read identification information of the replacement part as a key; and an encrypting unit that encrypts the predetermined piece of information in the storage unit of the replacement part by using the key when the encryption judging unit judges that the predetermined piece of information has not been encrypted, wherein the key is unique to the identification information.

2. The image forming apparatus according to claim 1, wherein the encrypting unit performs the encryption processing on the predetermined piece of information after the image forming apparatus has shifted into any one of a standby mode and an electricity saving mode.

3. A method of controlling an image forming apparatus, comprising:

establishing a connection between a replacement part and the image forming apparatus, the replacement part having a storage unit that stores therein information including identification information unique to the replacement part;

judging based on consumption information indicative of how much the replacement part has been consumed whether the replacement part that is connected to the image forming apparatus needs replacement;

reading the identification information from the storage unit of the replacement part when it is judged at the judging that the replacement part needs replacement;

storing history data for encryption and/or decryption processing performed on the replacement part;

judging whether an encryption processing has been performed with respect to a predetermined piece of information by searching the history data stored in a main memory of the image forming apparatus, using the read identification information of the replacement part as a key; the history data for encryption and/or decryption processing performed on the replacement part; and encrypting the predetermined piece of information in the storage unit of the replacement part by using the key when it is judged that the predetermined piece of information has not been encrypted, wherein the key is unique to the identification information.

* * * * *